(12) United States Patent
Richard et al.

(10) Patent No.: US 8,919,239 B2
(45) Date of Patent: Dec. 30, 2014

(54) SERVO BRAKE ACTUATOR PISTON AND SERVO BRAKE EQUIPPED WITH SUCH A PISTON

(75) Inventors: Philippe Richard, Chelles (FR); François Gaffe, La Turballe (FR); Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 499 days.

(21) Appl. No.: 13/394,685

(22) PCT Filed: Aug. 11, 2010

(86) PCT No.: PCT/EP2010/061664
§ 371 (c)(1),
(2), (4) Date: Mar. 7, 2012

(87) PCT Pub. No.: WO2011/026717
PCT Pub. Date: Mar. 10, 2011

(65) Prior Publication Data
US 2012/0167560 A1 Jul. 5, 2012

(30) Foreign Application Priority Data

Sep. 7, 2009 (FR) ...................................... 09 04280

(51) Int. Cl.
*B60T 11/18* (2006.01)
*B60T 7/04* (2006.01)
(52) U.S. Cl.
CPC *B60T 11/18* (2013.01); *B60T 7/042* (2013.01)
USPC ........................................................ 91/369.2
(58) Field of Classification Search
USPC .................................. 91/369.1, 369.2, 376 R
See application file for complete search history.

(56) References Cited

U.S. PATENT DOCUMENTS

| 4,815,293 | A | | 3/1989 | Cadeddu | |
|---|---|---|---|---|---|
| 5,787,789 | A | * | 8/1998 | Suzuki | 91/376 R |
| 6,006,649 | A | * | 12/1999 | Parker et al. | 91/369.2 |
| 6,826,999 | B2 | * | 12/2004 | Verbo et al. | 91/376 R |
| 7,634,960 | B2 | * | 12/2009 | Kramer et al. | 91/369.2 |

FOREIGN PATENT DOCUMENTS

| CN | 1200790 | 12/1998 |
|---|---|---|
| CN | 1468182 | 1/2004 |
| CN | 1663857 | 9/2005 |
| EP | 1847431 | 10/2007 |
| JP | H08332943 | 12/1996 |
| JP | 2000127947 | 5/2000 |
| JP | 2003530258 | 10/2003 |
| JP | 2008162462 | 7/2008 |

OTHER PUBLICATIONS

PCT/EP2010/061664 International Search Report dated Sep. 22, 2010 (Translation and Original, 4 pages).

* cited by examiner

*Primary Examiner* — Thomas E Lazo
(74) *Attorney, Agent, or Firm* — Michael Best & Friedrich LLP

(57) ABSTRACT

Actuator piston (100) formed by an injection-molded piece (120) consisting of a cylindrical body (121) and a collar (122) to receive the hydraulic actuator (110) and the travel detector (160). The piece (120) comprises a shell (150) covering its front face and receiving the return spring (250) and the thrust rod (130).
The actuator piston (110) includes lugs (115) engaged behind the lugs (125) of the body (121), by a pivoting movement about the axis. The rotational position is blocked by a locking and guiding sleeve (180).

8 Claims, 4 Drawing Sheets

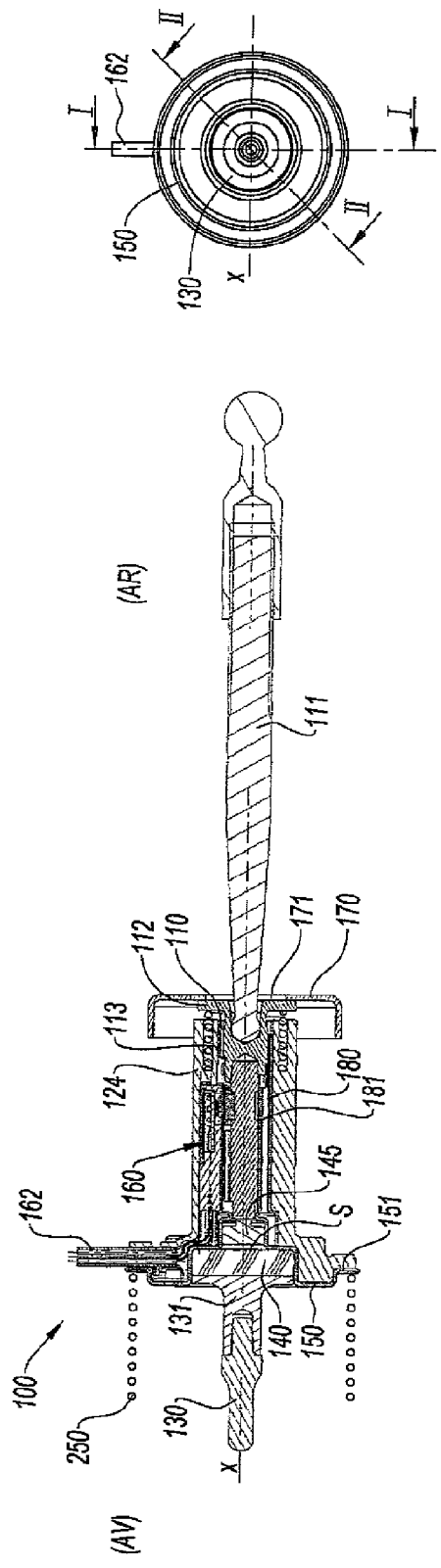
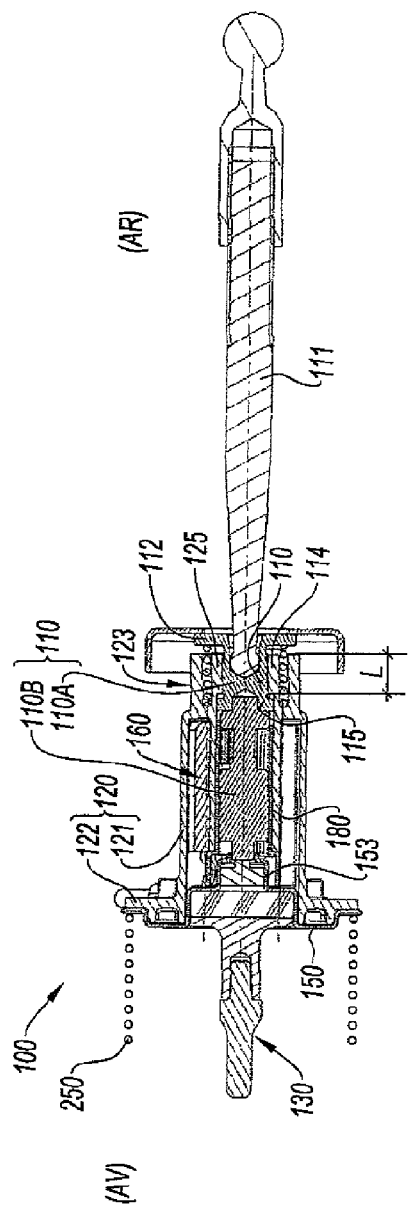

SERVO BRAKE ACTUATOR PISTON AND SERVO BRAKE EQUIPPED WITH SUCH A PISTON

BACKGROUND OF THE INVENTION

The present invention relates to an actuator piston receiving a hydraulic actuator linked to the control rod and acting via the reaction disk on the thrust rod, the actuator piston being subjected to the action of a return spring and the drive of the servo brake.

The invention also relates to a servo brake equipped with such an actuator piston.

There are already actuator piston servo brakes as defined above which have the drawback of an actuator piston body with relatively large dimensions generating a significant torque associated with the effort which is remote relative to the thrust rod; they also have a certain length because of the installation of the differential travel sensor.

The aim of the present invention is to develop an actuator piston and a servo brake equipped with such a piston which are of simple design, have a reduced diameter and small length to reduce the bulk overall.

SUMMARY OF THE INVENTION

To this end, the present invention relates to an actuator piston of the type defined above, characterized in that A—the actuator piston is formed by an injection-molded piece consisting of a cylindrical body at the rear and a collar at the front,
the cylindrical body receiving the hydraulic actuator and the travel detector,
the opening of the collar opening into the cylindrical body being occupied by a shell covering the front face of the collar to serve as a support for the return spring and receive the reaction disk, the rear face of which is accessible to the hydraulic actuator, B—the rear end of the cylindrical body of the actuator piston includes an internal cruciform arrangement of primary lugs protruding toward the interior to form the guiding bearing for the hydraulic actuator, the front of the lugs forming an abutment, C—the hydraulic actuator includes a hydraulic surface bounded at the front by a cruciform arrangement of secondary lugs of a form complementing that of the body of the actuator piston and with an offset overall peripheral orientation, in order, on assembly, to introduce the hydraulic actuator by the rear into the cylindrical body and retain it by the abutment of the secondary lugs against the primary lugs after relative pivoting thereof, D—a locking and guiding sleeve, provided with a cruciform arrangement of ribs adapted to the cruciform arrangement of the intervals between the secondary lugs, is introduced into the actuator piston by the front and fits with the ribs into the interval of the secondary lugs to block the rotation of the hydraulic actuator while allowing it to slide.

The actuator piston according to the invention has the advantage of consisting of an actuator piston body with a reduced diameter allowing for an effective transmission of the efforts exerted on the actuator piston toward the thrust rod, in the axis of the system. This makes it possible to envisage different motor drive systems and notably rack drives and, in particular, a single rack and pinion.

This actuator piston also has the advantage of a reduced production cost by virtue of the possibility of assembling all the elements of the actuator piston from one side.

According to an advantageous characteristic, the hydraulic actuator is terminated at the rear by an abutment collar supporting its return spring having a guiding cylindrical outer surface in front of the collar with a diameter corresponding to that of the bearing and with a length greater than that of the bearing.

This embodiment makes it possible to eliminate the key retaining the known hydraulic actuator in the body of the servo brake through the use of the cap of the servo brake constituting the abutment limiting the rear travel of the hydraulic actuator.

The assembly comprising the hydraulic actuator and elements associated therewith is blocked in rotation simply by the sleeve and the latter is blocked in rotation in the cylindrical body by a form link. In translation, it is blocked by the shell. The form link preferably consists of protruding lugs which slide into slots or on supports of the piece made of plastic material, forming the cylindrical body and the collar of the actuator piston. The transmission of the efforts exerted via the actuator piston on the master cylinder is achieved in excellent conditions by virtue of the short distance relative to the transmission axis which is reflected in a better efficiency avoiding the excessive friction losses on the guiding of the actuator piston body.

According to another advantageous characteristic, the locking and guiding sleeve has a flat side facing the reservation of the cylindrical body to receive the travel detector.

This arrangement makes it possible to easily incorporate the differential travel detector in the body of the actuator piston.

According to another advantageous characteristic, the hydraulic actuator consists of a rear part linked to the control rod and bearing the collar and the secondary lugs and a front part made of a nonmagnetic material, bearing the magnet facing the detector; this front part having a cruciform section, the intervals of which are identical to those of the section formed by the secondary lugs of the rear part, to receive the ribs of the sleeve.

The rear part is preferably made of steel and the front part of aluminum so as not to disturb the operation of the differential travel detector and above all to allow for its incorporation in the actuator piston.

According to another advantageous characteristic, the contour of the secondary lugs of the front part fits into the internal contour of the sleeve section and the external contour of the secondary lugs of the rear part extending beyond this contour, the ribs of the sleeve being extended in the form of fingers to fit into the interval of the secondary lugs of the rear part of the hydraulic actuator over the length necessary to the sliding movement of the hydraulic actuator.

This embodiment simplifies the assembly of the piston of the actuator while ensuring the sliding guidance of the hydraulic actuator.

According to another advantageous characteristic, the two parts are assembled by a form link such as a banding.

Finally, the invention relates to the servo brakes equipped with hydraulic actuators as defined above.

BRIEF DESCRIPTION OF THE DRAWINGS

The present invention will be described in more detail with the help of an example of a servo brake actuator piston represented in the appended drawings in which:

FIG. 1 is an axial cross section through the median plane I-I of the actuator piston according to the invention, FIG. 1A is a left side view of the actuator piston of FIG. 1, showing the arrangement of the two axial cutting planes I-I and II-II, FIG. 2 is a cross-sectional view according to II-II of the actuator piston.

FIG. 5A shows the hydraulic actuator and its part supporting the travel detection magnet and the locking and guiding sleeve aligned for their assembly, FIG. 5B shows the interleaving of the hydraulic actuator and its extension in the locking and guiding sleeve, FIG. 5C is a perspective view, in the opposite direction, showing the assembly of the hydraulic actuator and of the locking and guiding sleeve in the body of the actuator piston, the latter being represented very schematically.

DETAILED DESCRIPTION

Figure 3:
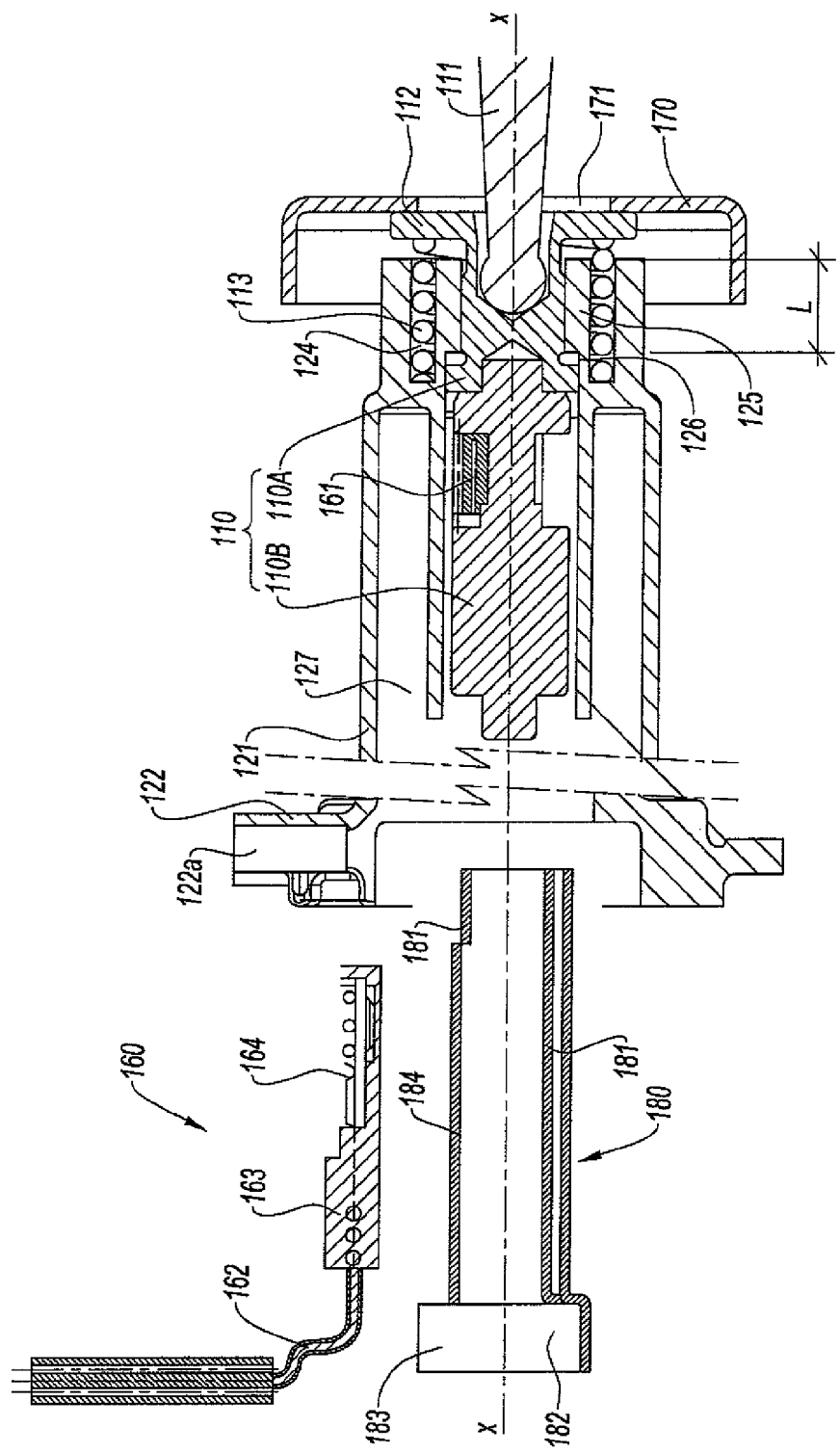
FIG. 3 is an axial cross-sectional view according to the planes I-I, II-II showing the dismantled parts of the actuator piston according to FIG. 1.

According to FIGS. 1 and 2, the invention relates to a servo brake actuator piston 100, receiving the hydraulic actuator 110 linked to the control rod 111, which is in turn linked to the brake pedal which is not represented and controls a master cylinder via a thrust rod 130 actuated in the normal operating conditions of the servo brake by the actuator piston 100 or actuated, in the event of failure of the servo brake, directly by the hydraulic actuator 110 bearing on the reaction disk 140 thrusting the thrust rod 130. The actuator piston 100 is subject to the action of a simply outlined return spring 250. The servo brake is an electric servo brake whose motor is, preferably, an electric motor transmitting its controlled movement to the actuator piston. These means are not represented.

The hydraulic actuator 110 and the various items of equipment at the input and at the output are aligned along an axis XX. For the description, it is appropriate to distinguish, by convention, the front side, directed toward the master cylinder and the rear side, directed toward the control rod 111. To simplify the drawings and the description, neither the servo brake, nor the master cylinder of this assembly are represented.

The actuator piston 100 consists of a piece 120, notably made of injection-molded plastic material formed by a cylindrical body 121 at the rear and a collar 122 at the front. The cylindrical body 121 houses the hydraulic actuator 110 and receives a differential travel detector 160 so that the relative movement of the hydraulic actuator 110 relative to the actuator piston 100 controls the servo brake which drives the actuator piston by means which are not represented.

The collar 122 surrounds the opening of the cylindrical body 121 of the piece 120. The front face of the collar 122 and the opening of the cylindrical body 121 receive a shell 150. The peripheral ring 151 of the shell 150 serves as a support for the return spring 250 of the actuator piston and its median part forms a housing 152 receiving the reaction disk 140 whose front face bears against the base 131 of the thrust rod 130. The rear face of the reaction disk 140 bears against the shoulder 155 of the housing 152 of the shell 150.

The shell 150 is extended by a small rear housing 153, with an opening 154 about the axis XX and receiving a transmission piece in the form of a piston 145, rigid, which can move by sliding in this housing 153 to bear against the reaction disk 140 thrust by the hydraulic actuator 110 when the servo brake fails.

The rear end 123 of the cylindrical body 121 receives the hydraulic actuator 110 and retains the latter, while enabling it to slide. The rear of the servo brake is closed by a cap 170 which is open about the axis XX for the passage of the control rod 111 while retaining the hydraulic actuator 110.

The hydraulic actuator 110 comprises, to this end, at its rear end, a collar 112 with a diameter larger than the opening 171 of the cap 170 in order to be retained by the cap 170 fixed to the body of the servo brake which is not represented.

A return spring 113 largely housed in a peripheral groove 124 of the rear of the body 110 of the actuator piston, bears against the collar 112 of the hydraulic actuator 110 and pushes the latter back, to abut against the cap 170.

As shown by the cross sections of FIGS. 1 and 2 along the two cutting planes (FIG. 1A) and the rear end 123 of the cylindrical body 121 comprises an internal cruciform arrangement consisting of primary lugs 125 protruding toward the interior of the cylindrical body 121 and forming the guiding bearing for the hydraulic actuator 110. These primary lugs 125 have a certain length (L) corresponding to the surface of the bearing of the hydraulic actuator 110 and they end, on the front side, with an abutment surface 126 beyond which the internal diameter of the cylindrical body 121 widens.

The hydraulic actuator 110 cooperates with this slide bearing formed by the lugs 125 by being retained by the abutment 126. For this, the hydraulic actuator 110 includes a slip cylindrical surface 114 cooperating with the bearing and with a length longer than that (L) of the bearing.

Beyond this guiding surface 114, the hydraulic actuator 110 includes a cruciform arrangement consisting of secondary lugs 115 extending toward the exterior of the section of the cylindrical guiding surface 114 and having a form complementing that of the cruciform arrangement of the primary lugs 125 of the body 121. This means that the form of the secondary lugs 115 substantially corresponds to the interval remaining between the primary lugs 125 of the cylindrical body 121. The peripheral arrangement is identical but the angular orientation is offset so that, on assembly, the hydraulic actuator 110 is introduced by the rear into the cylindrical body 121 of the actuator piston 120 by being in an angular orientation along the axis XX, offset relative to the angular orientation of the cylindrical body 121 so as to pass the secondary lugs 115 into the interval of the primary lugs 125. When the hydraulic actuator 110 is sufficiently engaged for the secondary lugs 115 to be in front of the primary lugs 125, a relative pivoting movement between the hydraulic actuator 110 and the cylindrical body 121 places the secondary lugs 115 at least in partial peripheral overlap with the primary lugs 125 and in front of them.

This angular orientation is then blocked so that the hydraulic actuator 110 is retained in the cylindrical body 121 while being able to slide relative to the latter against the action of its return spring 113 put in place before the introduction and the locking of the hydraulic actuator 110 in the cylindrical body 121.

The orientation of the hydraulic actuator 110 about the axis XX is blocked relative to the cylindrical body 121 of the actuator piston by a locking and guiding sleeve 180 introduced by the front side of the actuator piston 100 through the opening of the collar 122 and its cylindrical body 121. This sleeve 180 which is slid into the cylindrical body 121, has a cruciform arrangement of ribs 181 (FIG. 1) with a section and arrangement identical to the cruciform arrangement of the interval of the secondary lugs 115 of the hydraulic actuator 110 and with a length such that, when the sleeve 180 is placed in the cylindrical body 121, the guiding ribs 181 fit in the interval between the secondary lugs 115 regardless of the sliding position of the hydraulic actuator 110. The hydraulic actuator 110 is thus blocked in rotation relative to the cylindrical body 121, that is to say, the actuator piston 100, while being able to slide in a guided manner between the ribs 181 of the sleeve 180 according to the thrust exerted by the brake pedal on the control rod 111 and the movement applied to the actuator piston 100 by the servo brake.

After the sleeve 180 has been put in place, the travel detector 160, comprising, as appropriate, the signal processing circuit, in an appropriate reservation 127 of the sleeve 180, is introduced, to be precisely positioned relative to the magnet 161 of the hydraulic actuator 110.

The cable 162 of the detector 160 passes into a groove of the collar 122 to exit therefrom as indicated and be linked to the servo brake control circuit.

After the travel detector 160 has been put in place, the actuator piston 100 receives the shell 150 housing the reaction disk 140. The shell 150 is subjected, on its external ring 151, to the thrust of the return spring 250, surrounding the thrust rod 130, which is in turn applied against the reaction disk 140.

In this embodiment, the hydraulic actuator 110 consists of two parts, a rear part 110A provided with the secondary lugs 115 and a cylindrical front part 110B, forming the extension and provided with the magnet 161 in an appropriate placement, the magnet 161 so as to cooperate with the circuit of the detector 160 in front of which this magnet passes while the actuator piston 100 is operating. This cylindrical part 110B has a section and an orientation which are identical to the cruciform section formed by the secondary lugs 115 of the rear part 110A of the hydraulic actuator 110.

The extension 110B of the piston 110 is made of a non-magnetic material.

At the front, the part 110B is extended by a reduced section 110C to pass through the opening 154 of the rear housing 153 of the shell 150, enter into contact with the intermediate piston 145 and thrust it; the latter will thrust the reaction disk 140 in emergency operating mode.

The contour of the secondary lugs 115A corresponds to the internal section of the cylindrical body 121, at least in its rear part and the contour of the secondary lugs 115B corresponds to the internal contour of the sleeve 180.

The rear part 110A and the front part 110B are assembled together by a form link, according to means that are not detailed.

FIG. 3 shows, in a simpler way, the structure of the body of the broken-down actuator piston, the cross section being drawn on the plane II-II for the cylindrical body 121 and on the cutting plane I-I for the collar 122. The hydraulic actuator 110 (110A) with its extension 110B are represented in place in the cylindrical body 121 of the actuator piston 100, but the sleeve 180 has not yet been put in place between the two parts 110A, 110B of the hydraulic actuator 110 and the cylindrical body 121.

On the left, the sleeve 180 is shown with, in the bottom part, in cross section, the form of a hollow internal rib 181 used to block the rotation and guide the piston 110, that is to say its rear part 110A and its front part 110B.

The sleeve 180 has a front part 182, enlarged, receiving the shell 150 with the housing of the reaction disk 140 and the rear extension 153 with the intermediate piston 145 (these elements are not represented in this figure). The top 183 is open for front access to the reservation 127 for the placement of the detector 160 in the cylindrical body 121.

The support 163 for the detector 160 with the plate 164 of the detection circuit and the link cable 162 are shown detached.

In this view, the rear part 123 of the cylindrical body 121 has been represented with the primary lugs 125 and along the cutting plane II-II of FIG. 1A whereas the front with the collar 122 is represented cut along the cutting plane I-I of FIG. 1A.

At the front, the internal form of the cylindrical body 121 also appears with, in the top, the reservation 127 receiving the detector 160 and its support 163. The top of the sleeve 180 is formed by a flat side 184 to pass under the detector 160 and it is extended at the rear by ribs 181; more specifically, the ribs are extended by branches alone 181*a*, the cylindrical jacket not being designed to be housed in the interval of the secondary lugs 115A of the rear part 110A whereas, as already indicated, the radial height of the lugs 115B is less than that of the lugs 115A. The lugs 115B are covered by the sleeve 180 and their interval receives the ribs 181 whereas the secondary lugs 115A are housed and moved between the branches 181A forming the extensions of only the ribs 181 in the jacket of the sleeve 180.

Figure 4:
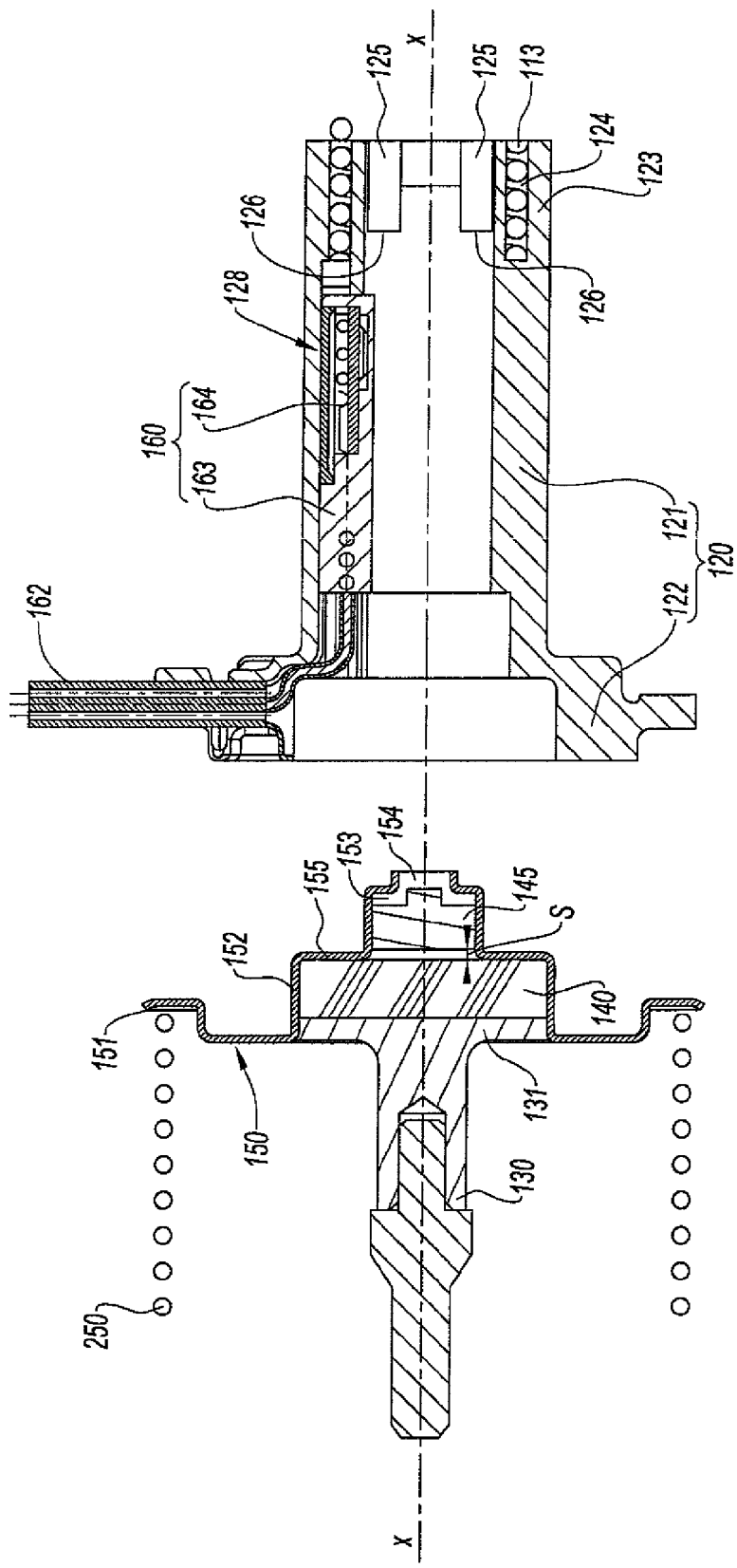
FIG. 4 is an axial cross section along the plane I-I of the actuator piston according to FIG. 1A, showing other dismantled parts.

FIG. 4 is a cross-sectional view drawn in the same spirit as that of FIG. 3, showing two primary lugs 125 whose median planes are situated respectively on the plane II-II and the plane perpendicular thereto. The front, cut along the plane I-I of FIG. 1A, shows the cylindrical body with the travel detector 160 put in place and, facing the collar 122, the shell 150 bearing the reaction disk 140, the intermediate piston 145 and the thrust rod 130.

Figure 5A:
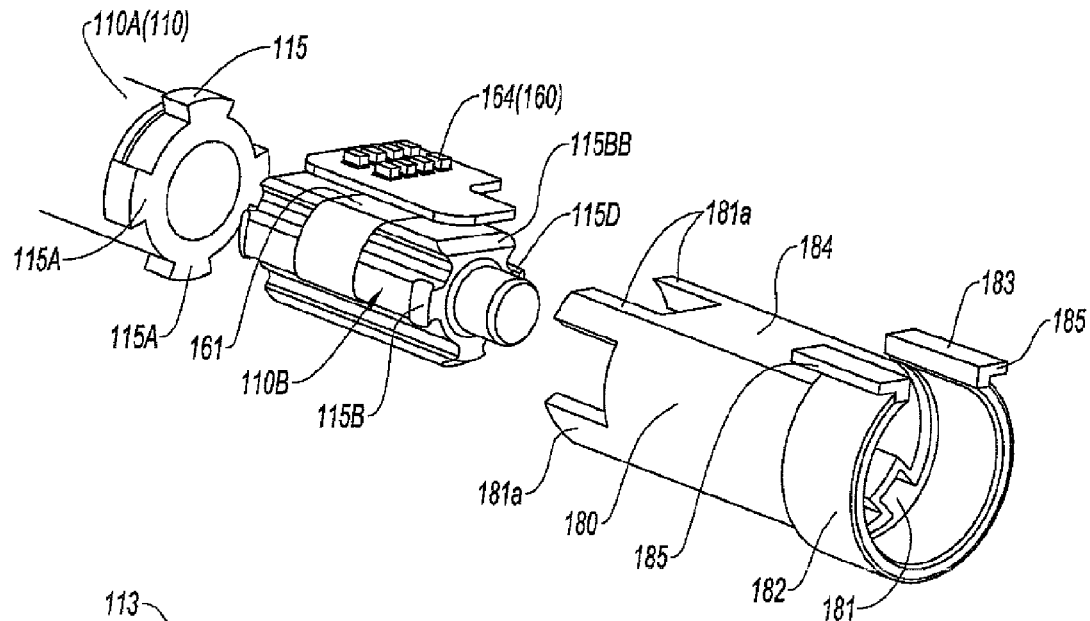
FIGS. 5A-5C are schematic perspective views showing the hydraulic actuator and the locking and guiding sleeve.
Figure 5B:
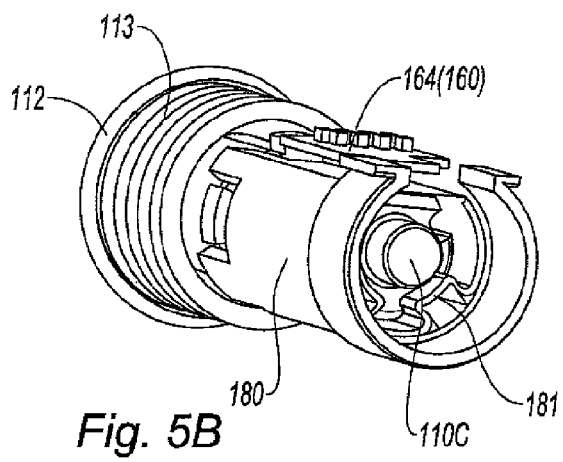
Figure 5C:
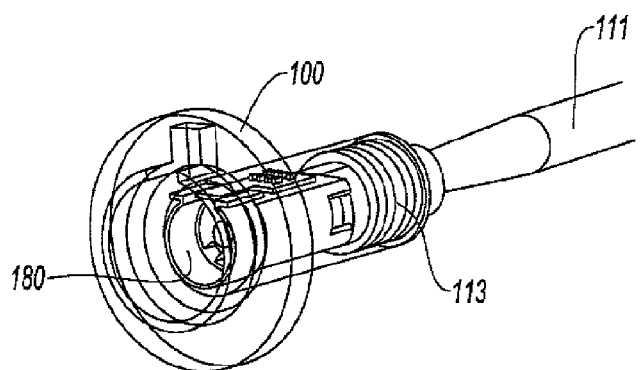

FIGS. 5A-5C give a better understanding of the assembly of the actuator piston without representing the piece 120 and the shell 150.

FIG. 5A is an exploded view with the components aligned. The part 110A of the hydraulic actuator 110 is represented behind its front part 110B (or extension) and the circuit 164 of the detector 160, represented above the hydraulic actuator 110B with its magnet 161. The locking and guiding sleeve 180 consists of a body of cylindrical form with its flat top 184, bounded by a front part 182 of larger diameter, the top 183 of which is cut and is extended on either side of this cut part by two guiding and stabilization lugs housed in grooves of the piece 120. The ribs 181, in relief toward the interior of the sleeve 180, appear on the right. These ribs 181 are extended on the rear side by the four branches 181*a* of the same section. The ribs are housed in the intervals between the lugs 115, 115B of the two parts 110A, B of the hydraulic actuator 110.

According to the embodiment represented in FIG. 5A, the hydraulic actuator 110 consists of a rear part 110A which is the hydraulic actuator itself or its part linked to the control rod 111 and a front part 110B. These two parts are fitted together, for example force-fitted as shown by the cross-sectional view of FIGS. 1, 2 and 3. These pieces are made of different materials, the rear part 110A being, for example, made of steel and the part 110B being made of a nonmagnetic material such as aluminum since it is situated level with the detector 160 and bears the magnet 161.

Generally, the section of the two parts 110A, 110B is identical or at least similar. In as much as the part 110B has a section strictly identical to that of the part 110A, it can be attached thereto and the duly formed hydraulic actuator 110 is put in place in the cylindrical body 121 by passing through the rear thereof then by locking by a quarter-turn-type pivot movement, as already explained.

If, however, as in the variant represented in FIG. 5A, the section of the front part 110B differs slightly from the section of the rear part 110A in that the three secondary lugs 115B are identical to the secondary lugs 115A of the rear part, the top lug 115BB differs therefrom by its width to receive the circuit board 164 of the detector 160. In this case, the rear part 110A will be put in place by passing through the rear end of the body 121 and the part 110B will be introduced by the front and forcibly pressed into the rear part 110A with its pilot point.

The channels formed between the lugs 115 are wider than the channels on either side of the lug 115BB. The section of the ribs 180 will be adapted to this different width. The same applies for the interval and the position between the lugs 115A which will have to receive the branches 181A of the same section as that of the ribs 181 of which it forms the extension.

Finally, and according to another variant which is not represented, the lugs 115B all have the same section, the dimensions of the circuit board 164 being reduced accordingly.

However, this slight structural difference between the two embodiments does not alter the principle of the assembly and the guidance of the hydraulic actuator 110 in the piece 120 of the actuator piston 100 with the interposition of the locking and guiding sleeve 180.

FIG. 5B shows the assembly of the hydraulic actuator 110 and of the sleeve 180 with the return spring 113 of the hydraulic actuator 110.

FIG. 5C is a front view showing the duly produced assembly with the actuator piston 100 represented schematically.

The actuator piston, as partially explained above, is assembled as follows:

- The hydraulic actuator 110, or at least its rear part 110A, is first installed in the rear end 123 of the cylindrical body 121 of the actuator piston 100 by sliding and locking by partial rotation, and this is done after the spring 113 has been put in place in the housing 124.
- After the hydraulic actuator has been put in place without the front part 110B, the front part 110B is put in place by firstly pressing it into the corresponding housing of the rear part 110A.
- After that, the detector 160 with its cable 162 is put in place in the piece 120, then the front of the piece 120 is closed by the shell 150, the intermediate piece 145, the reaction disk 140 and the thrust rod 130.

All the elements are assembled along a single axis which constitutes the main axis. Overall, the valve body or actuator piston has a reduced diameter allowing for the transmission of the remote efforts resulting from the driving of the actuator piston, closer to the thrust axis (axis XX) on the master cylinder. The introduction of a significant torque is thus avoided, which is reflected in a better effectiveness linked to reduced friction on the guiding of the actuator piston.

By shifting the reaction disk toward the master cylinder, and by the specific form of the pieces, it is possible to reduce the diameter of the piston. The incorporation of the travel sensor also makes it possible to save on axial bulk.

The present invention relates to the field of braking systems and the automobile equipment industry manufacturing braking systems.

PARTS LIST 100 actuator piston
110 hydraulic actuator
110A front part of the hydraulic actuator
110B rear part of the hydraulic actuator
110C extension of reduced section
111 control rod
112 collar of the hydraulic actuator
113 return spring
114 cylindrical surface
115, 115, 115B, 115BB secondary lugs
120 piece made of plastic material
121 cylindrical body
122 collar
112 open groove
123 rear of the cylindrical body
124 groove
125 primary lugs
126 abutment surface
127 reservation
130 thrust rod
131 base of the thrust rod
140 reaction disk
145 transmission piece/inter-mediate piston
150 shell
151 peripheral ring
152 housing
153 rear housing
154 opening
155 shoulder
160 differential travel detector
161 magnet
162 link cable
163 detector support
164 circuit board
170 cap
171 opening
180 sleeve
181 rib
181a branch
182 front part
183 top
184 flat side
185 lugs
250 return spring
S jump
XX axis
AV front (master cylinder side)
AR rear (control rod side)

The invention claimed is:

1. An actuator piston receiving a hydraulic actuator linked to a control rod and acting via a reaction disk on a thrust rod, the actuator piston being subjected to the action of a return spring and of a drive of the servo brake, characterized in that A—the actuator piston (100) formed by an injection-molded piece (120) including a cylindrical body (121) at the rear and a collar (122) at the front,
the cylindrical body (121) receiving the hydraulic actuator (110) and a travel detector (160),
a opening of the collar (122) opening into the cylindrical body (121) being occupied by a shell (150) covering a front face of the collar to serve as a support for the return spring (150) and receive the reaction disk (140), a rear face of which is accessible to the hydraulic actuator (110), B—a rear end (123) of the cylindrical body (121) of the actuator piston includes an internal cruciform arrangement of primary lugs (125) protruding toward the interior to form a guiding bearing for the hydraulic actuator (110), the front of the lugs forming an abutment (126), C—the hydraulic actuator (110) includes a cylindrical surface that is bounded at the front by a cruciform arrangement of secondary lugs (115) of a form complementing that of the body (121) of the actuator piston and with an offset overall peripheral orientation, in order, on assembly, to introduce the hydraulic actuator (110) by the rear into the cylindrical body (121) and retain it by the abutment of the secondary lugs (115) against the primary lugs (125) after relative pivoting thereof, D—a locking and guiding sleeve (180), provided with a cruciform arrangement of ribs (181) adapted to the cruciform arrangement of the intervals between the secondary lugs (115), is introduced into the actuator piston (100) by the front and fits with the ribs (181, 181a) in the interval of the secondary lugs (115) to block a rotation of the hydraulic actuator (110) while allowing it to slide.

2. The actuator piston according to claim 1, characterized in that the hydraulic actuator (110) is terminated at the rear by an abutment collar (112) supporting a return spring (113) having a guiding cylindrical outer surface (114) in front of the collar with a diameter corresponding to that of the bearing and with a length greater than that of the bearing.

3. The actuator piston according to claim 2, characterized in that the hydraulic actuator (110) consists of a rear part (110A) linked to a control rod (111) and bearing the collar (112) and the secondary lugs (115, 115A) and a front part (110B) made of a nonmagnetic material, bearing a magnet (161) facing the detector (160), the front part (110B) having a cruciform section, the intervals of which are identical to those of the section formed by the secondary lugs (115, 115A) of the rear part (110A), to receive the ribs (181) of the sleeve (180).

4. The actuator piston according to claim 3, characterized in that the two parts (110A, 110B) are assembled by a form link.

5. The actuator piston according to claim 1, characterized in that the locking and guiding sleeve (180) is blocked in rotation in the cylindrical body (121) by a form link (lugs 185) and in translation by the shell (150).

6. The actuator piston according to claim 1, characterized in that the locking and guiding sleeve (180) has a flat side (184) facing the reservation (127) of the cylindrical body (121) to receive a travel detector (160).

7. The actuator piston according to claim 1, characterized in that a contour of the secondary lugs (115B) of the front part (110B) fits into a internal contour of the sleeve section (180) and an external contour of the secondary lugs (115A) of the rear part (110A) extending beyond this contour, the ribs (181) of the sleeve (180) being extended in the form of fingers (181a) to fit into the interval of the secondary lugs (115A) of the rear part (110A) of the hydraulic actuator (110) over a length necessary to a sliding movement of the hydraulic actuator (110).

8. A servo brake, characterized in that it comprises an actuator piston according to claim 1.

* * * * *